S. G. BLACKWOOD & V. E. BRADLEY.
EXPANSIBLE PIPE COUPLING.
APPLICATION FILED MAY 15, 1914.
1,171,311.
Patented Feb. 8, 1916.
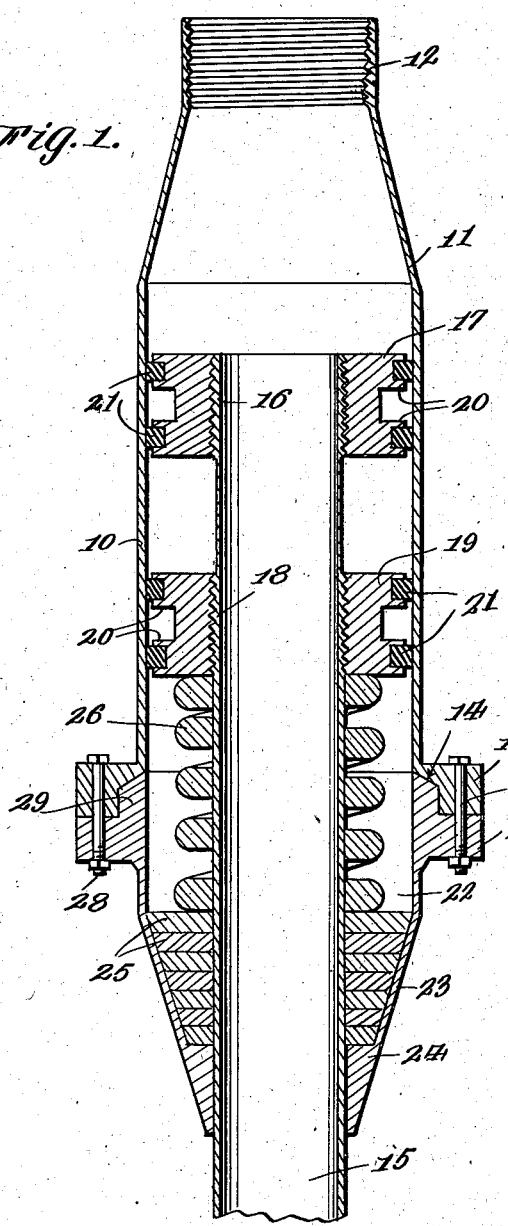
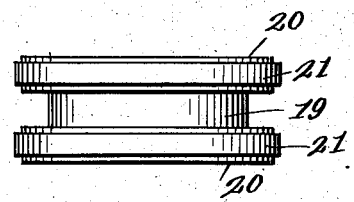
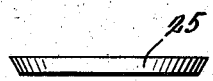
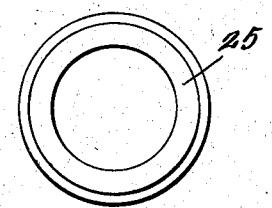
Witnesses
Guy M. Spring.
Ross J. Woodward.
Inventors
Spanow G. Blackwood.
Van E. Bradley.
By Richard Owen.
Attorney

UNITED STATES PATENT OFFICE.

SPARROW G. BLACKWOOD AND VAN E. BRADLEY, OF RALEIGH, NORTH CAROLINA.

EXPANSIBLE-PIPE COUPLING.

1,171,311.  Specification of Letters Patent.  Patented Feb. 8, 1916.

Application filed May 15, 1914. Serial No. 838,774.

*To all whom it may concern:*

Be it known that we, SPARROW G. BLACKWOOD and VAN E. BRADLEY, citizens of the United States, residing at Raleigh, in the county of Wake and State of North Carolina, have invented certain new and useful Improvements in Expansible - Pipe Couplings, of which the following is a specification.

This invention relates to an expansible pipe coupling and the principal object of the invention is to provide a coupling by means of which two sections of a pipe may be connected to permit the pipe to expand and contract when affected by heat and cold without danger of the coupling being drawn and caused to leak.

Another object of the invention is to provide a coupling of the type described which is so constructed that it may be easily put together or taken apart for repairs or cleaning.

Another object of the invention is to provide a coupling of the type described which will be very simple in construction but which will be very efficient in operation.

This invention is illustrated in the accompanying drawings wherein—

Figure 1 is a longitudinal sectional view through the pipe coupling; Fig. 2 is a view in elevation of one of the packing heads carried by one section of the pipe; Fig. 3 is an elevation of one of the packing rings forming part of the coupler; and Fig. 4 is an elevation of the packing ring shown in Fig. 3.

The coupler comprises a tubular body portion 10 which has one end portion 11 tapered and terminating in an internally threaded neck 12 and has its opposite end portion provided with an outwardly extending collar 13 which is cut to form a beveled seat 14. The body portion of the coupler is connected with one section of a pipe and the second section 15 of the pipe extends into the body portion 10 and is provided with a threaded end portion 16 upon which the head 17 is placed and the threaded section 18 upon which the head 19 is placed. These heads 17 and 19 are formed similar to piston heads and are provided with annular collars 20 in the edges of which are formed grooves to receive the packing rings 21. The auxiliary section or cap 22 of the coupling is provided with a tapered end portion 23 which terminates in a thickened neck 24 which neck provides an abutment for the packing rings 25 placed in the tapered end portion 23. These packing rings are formed as shown in Figs. 3 and 4 and fit tightly within the tapered portion 23 of cap 22 and prevent leakage around pipe 15. A spiral spring 26 is placed upon pipe 15 between the packing rings 25 and the head 19 so that the pipe 15 will be normally held in the position shown in Fig. 1. As the pipes expand and contract from heat and cold the spring permits sliding of the pipe 15 within the body portion 10 of the coupling thus taking up the expansion and contraction and preventing the joints of the pipe from being worked loose.

In order to connect the cap 22 with the body portion of the coupling there is provided a collar 27 which fits against the collar 13 and is tightly secured thereto by means of bolts 28. The inner end portion 29 of the cap fits within the collar 13 and has its edge beveled to conform to the contour of the beveled face 14 thus permitting a very tight joint to be formed which will prevent any danger of leakage. It should also be noted that the packing rings 21 will tend to prevent water from working into the space between the heads and packing rings 25 and thus serve to assist in preventing any danger of leakage. If it is desired to replace the packing rings 25 and 21 the bolts 28 can be removed and the cap 22 then slid upon the pipe 15 to a position which will permit the packing rings 25 to be removed and new ones put in place. The body portion 10 can then be unscrewed from the pipe with which it is connected and slipped off of the heads 17 and 19 thus permitting the heads to be removed for the purpose of repair or if it is only desired to renew the packing rings carried by the head the packing rings can be removed without the heads being removed. The coupling can then be very easily reassembled and held in the assembled position by the bolts 28. We have therefore provided a coupling which is so constructed that two sections of a pipe affected by heat and cold such as a steam or hot water pipe may be connected to permit of expansion and contraction. It will also be noted that this coupling is very simple in construction but is very efficient in operation and will not easily get out of order and need to be repaired.

What is claimed is:—

1. A pipe coupling comprising a tubular body portion having one end tapered and terminating in an internally threaded neck, the opposite end portion being provided with an outwardly extending collar having its inner portion cut to form a beveled bearing surface, a pipe extending into said body portion and having its inner end portion threaded, a plurality of heads threaded upon the inner end portion of said pipe and positioned in spaced relation and provided with annular ribs having grooves formed therein, packing rings mounted in the grooves of said heads, a cap fitting about said pipe and having one end portion extending into the collar of said body portion and conforming to the contour of the interior thereof, a collar for said cap engaging the collar of said body portion and removably connected therewith, the outer end portion of said cap being tapered and terminating in a thickened neck forming an abutment shoulder, packing rings placed within the tapered portion of said cap about said pipe, and a spring positioned about said pipe between said last named packing rings and one of said heads.

2. A pipe coupling comprising a tubular body portion having one end portion provided with an outstanding collar, a pipe extending into said body portion and having its inner end portion threaded, a plurality of heads threaded upon the inner end portion of said pipe and positioned in spaced relation and provided with annular ribs having grooves formed therein, packing rings mounted in the grooves of said heads, a cap fitting about said pipe and having one end portion engaging the collar of said body portion and removably connected therewith, the outer end portion of said cap being tapered and terminating in a thickened neck forming an abutment shoulder, packing rings placed within the tapered portion of said cap about said pipe, and resilient means positioned between said last named packing rings and one of said heads.

In testimony whereof we affix our signatures in presence of two witnesses.

SPARROW G. BLACKWOOD.
VAN E. BRADLEY.

Witnesses:
S. S. BRADLEY,
J. N. KEELIN, Jr.